(No Model.)

M. REILLY.
FIRE KINDLER.

No. 400,252. Patented Mar. 26, 1889.

Witnesses:
C. L. Sundgren
Emil Herter

Inventor.
Michael Reilly
by his attys
Brown & Hall

UNITED STATES PATENT OFFICE.

MICHAEL REILLY, OF BROOKLYN, NEW YORK.

FIRE-KINDLER.

SPECIFICATION forming part of Letters Patent No. 400,252, dated March 26, 1889.

Application filed September 10, 1887. Serial No. 249,296. (No model.)

*To all whom it may concern:*

Be it known that I, MICHAEL REILLY, of Brooklyn, in the county of Kings and State of New York, have invented a new and useful Improvement in Fire-Kindlers and Fuel-Cartridges, and in the Method of Making the Same, of which the following is a specification.

Bone-black or animal charcoal is very largely used in filtering hydrocarbon oils, and after such use of the bone-black there necessarily remains therein from twenty to thirty per cent. of oil, of which the larger part is difficult of abstraction.

The important object of my invention is to utilize this spent bone-black for fire-kindlers and fuel-cartridges, for which purpose it is very valuable on account of the oil remaining in it. If the oil remaining in the bone-black shall not be enough to adapt it for the purpose, the fire-kindlers or fuel-cartridges made therefrom may be made to take up more oil, as bone-black or animal charcoal, owing to its porous character, is one of the more ready absorbents.

I will describe in detail a fire-kindler embodying my improvement, and then point out the novel features in a claim.

In the accompanying drawings I have sought to show as clearly as possible both a small-sized fire-kindler and a larger fuel-cartridge embodying my invention.

Figure 1:
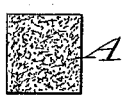
Figure 2:
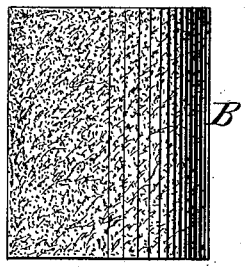

Figure 1 represents a fire-kindler, and Fig. 2 a fuel-cartridge.

A in Fig. 1 designates the fire-kindler, which may be made in cubical, cylindrical, or other shape, and may be, say, four to six ounces in weight; and B in Fig. 2 designates the fuel-cartridge, which may be a cube, cylinder, or other shape, and which may weigh several pounds.

As above stated, there remains in the bone-black which has been used for filtering oil a considerable portion of oil, most of which is difficult of recovery, and it is of comparatively little value for the purposes to which it has heretofore been applied. This bone-black, either with only the oil which it naturally contains after being used as a filtering medium, or with more oil which it has been made to absorb, is of great value for fire-kindlers or fuel-cartridges, owing to its great porosity and its resistance to heat. To put it in proper shape for market, I preferably combine with the spent bone-black a sufficient proportion of clay, plaster-of-paris, or other binding material, and after adding sufficient water to make a soft paste I form or cast this paste in suitable molds which may be made of tin, and which are of sizes to produce the desired sizes of fire-kindlers or fuel-cartridges. After the bodies, blocks, or bricks are removed from the molds they are dried at a heat sufficient to evaporate the water, but not the oil. As a cement or binding material, I now deem it desirable to employ with plaster-of-paris a little fire-clay or asbestus cement, which enables the cartridge to better resist the action of the fire; but it is believed that such fire-clay or asbestus cement will not be needed in the smaller-sized fire-kindlers, which are intended to be used but once and left in the fire.

The fuel-cartridges which are intended to be reused should be made with more care, and sufficient fire or pipe clay or asbestus cement should be added during their manufacture to enable them to withstand the heat for a long time and to be used repeatedly. The proportions of bone-black and cement or binding material added thereto may be widely varied, it being my intention to only employ sufficient cement or binding material to hold the bone-black in a body and prevent its disintegration. I now deem it desirable to employ three parts of spent bone-black and one part of plaster-of-paris. After the fire-kindlers and cartridges are manufactured sufficient oil to bring them up to the point of saturation may be added. The small-sized fire-kindlers, which are intended to be but once used, are allowed to remain in the fire which they have ignited and are thrown away with the ashes; but if the cartridges are made to be repeatedly used they are allowed, after the oil is once burned out of them, to reabsorb sufficient oil to render them capable of effective reuse, and in such case the cartridge will form, as it were, a wick from which the oil is consumed.

What I claim as my invention, and desire to secure by Letters Patent, is—

As a new article of manufacture, a fire-kindler composed of spent bone-black saturated with oil and a binding material, the whole being formed into a block or brick, substantially as specified.

MICHAEL REILLY.

Witnesses:
STEPHEN McFADDEN,
WM. H. WILLCOX.